Oct. 2, 1951 P. L. BANNAN 2,569,651
POWER-TRANSMITTING MECHANISM FOR NARROW-GAUGE TRACTORS
Filed Feb. 9, 1948 3 Sheets-Sheet 2

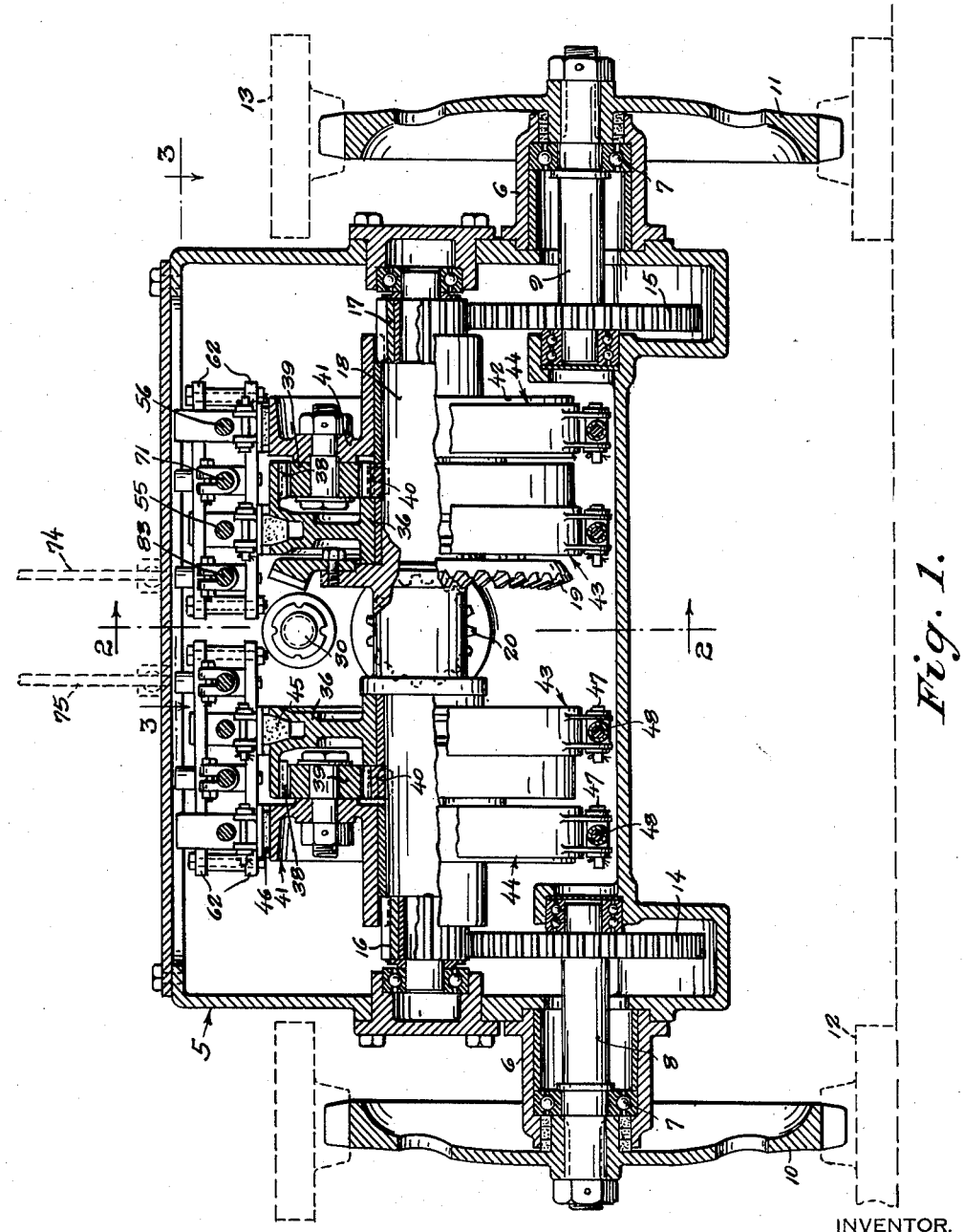

INVENTOR.
Philip L. Bannan
BY
ATTORNEY

INVENTOR.
Philip L. Bannan
BY
ATTORNEY

Patented Oct. 2, 1951

2,569,651

UNITED STATES PATENT OFFICE 2,569,651

POWER-TRANSMITTING MECHANISM FOR NARROW-GAUGE TRACTORS

Philip L. Bannan, Seattle, Wash., assignor to Western Gear Works, Seattle, Wash., a corporation of Washington Application February 9, 1948, Serial No. 7,214

11 Claims. (Cl. 74—710.5)

This invention relates to the transmission of power, and is particularly directed to a transmission mechanism for use on crawler-type tractors. The transmission of the present invention especially lends itself to small-size tractors, and one object is to provide an assembly of parts embodying steering mechanism and change-speed mechanism compacted into an unusually small compass within a common housing.

It is a further and important object to devise a power-transmitting mechanism for crawler-type tractors the steering functions of which are performed through gears capable of being tied for exact rotational correspondence and as distinguished from the commonly used differential-planetary gearing, the arrangement being one which allows the tractor to execute sharper turns and generally promoting maneuverability while serving, however, to normally hold the tractor to a straight-line course in that the two crawler tracks work as one excepting when the same are selectively inactivated for purposes of steering.

As a still further object, the invention aims to provide a steering mechanism for crawler-type tractors having a pair of alternatively activated brakes applied to the driving connection which leads to each of the two crawler tracks, and which brakes are of such a nature as to allow the entire assembly to run in oil, the advantage, as distinguished from a dry clutch, being that a brake drum designed to run in oil may be made sufficiently compact to permit the same to be incorporated in the transmission of a very small tractor.

The invention has the further object still of so devising a steering mechanism for use with a crawler-type tractor as to enable each of the crawler tracks to be controlled by the manipulation of only a single lever rather than requiring the conventional two levers, this feature being of importance not alone from the standpoint of operating facility but also as a means of cutting down space requirements where, as in small tractors, available room is a major factor.

The invention has the yet further and important object of engineering a transmission mechanism permitting all necessary adjustments upon the brakes and upon the control lever to be performed outside the transmission case and by the use of only a single tool.

Other and still more particular objects and advantages will, with the foregoing, appear and be understood in the course of the following description and claims, the invention consisting in the novel construction and in the adaptation and combination of parts hereinafter described and claimed.

In the accompanying drawings:

Figure 1 is a transverse vertical sectional view illustrating a transmission mechanism embodying the teachings of the present invention and portraying therewith the driver wheels of a crawler-type tractor to which the same is applied, dotted lines being used to portray the crawler tracks and also to show the manually operated levers which control the steering of the tractor.

Figure 3:
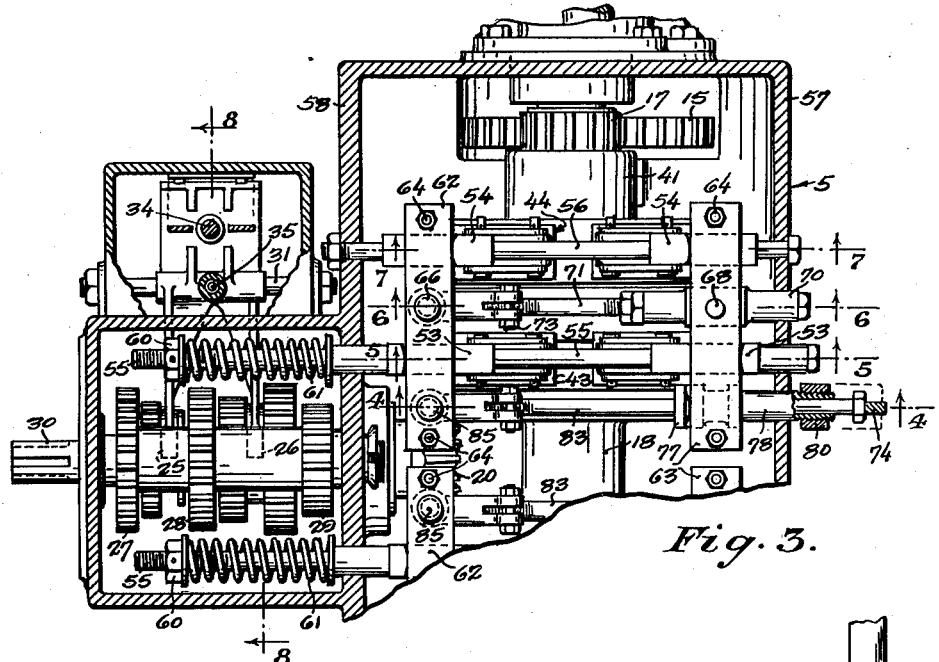
Fig. 3 is a fragmentary horizontal sectional view on line 3—3 of Fig. 1.
Figure 8:
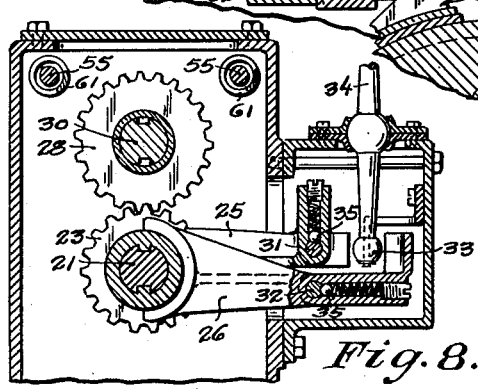

Figs. 4, 5, 6 and 7 are fragmentary longitudinal vertical sectional views taken to an enlarged scale on respective lines 4—4, 5—5, 6—6 and 7—7 of Fig. 3; and Fig. 8 is a fragmentary transverse vertical sectional view on line 8—8 of Fig. 3.

Before proceeding with a detailed description of the present invention it may be here stated that the running gear of the tractor comprises an engine, a forward-and-reverse clutch assembly driven off the engine, a change-speed mechanism whose input end is powered off the output end of the clutch assembly, and a planetary steering assembly driven off the output end of the change-speed mechanism and itself driving the two driver wheels which give tractive energy to the crawler tracks of the tractor. For the crawler tracks, each driver wheel is perforce complemented by an idler wheel, and the preferred lay-out of this running gear locates the driver wheels to the rear and places the engine at the forward end of the tractor between the idler wheels, with the forward-and-reverse clutch assembly lying to the rear of the engine and forwardly of the transmission case, this case containing both the change-speed and the steering mechanisms in separate chambers separated by a partitioning wall. Neither the engine nor the forward and reverse clutch assembly are deemed to incorporate structural features patentable over the art and I have accordingly deleted the same from the drawing. There is, moreover, no particular novelty inherent to the change-speed mechanism but it is desirable to illustrate the same herein from the fact of its being housed within a chamber the casing of which is made in integral adjunct of the casing which houses the steering mechanism.

Referring to said drawings, the numeral 5 designates the casing for the steering mechanism and which, as can be seen from an inspection of Fig. 1, extends very nearly the full width of the tractor, carrying at each side a tubular extension 6 in which are received bearings, as 7, for the co-axial mounting of wheel-carrying stub axles 8 and 9, the wheels being designated 10 and 11 and being of the sprocket type for driving respective crawler tracks 12 and 13.

Splined upon the inner ends of these axles are respective spur gears, as 14 and 15, and in mesh with and driving these gears are respective pinions 16 and 17 receiving a journal mounting upon a driven master shaft 18 journaled for rotation about a transverse horizontal axis. The drive from the master shaft to these pinions will be hereinafter described, but suffice it to say at this point that the master shaft receives its drive through a bevel gear 19 which is belted or otherwise fixed thereto and powers the pinions through planetary devices one of which lies at one side and the other at the other side of the longitudinal median line of the case.

The bevel gear is placed more or less central to the length of said master shaft, and in mesh with and driving said bevel gear is a bevel pinion 20 fast upon the output shaft 21 of the change-speed mechanism, there being splined for endwise travel upon this output shaft a severalty of gears, each of different radius and designated 22, 23 and 24, which are selectively movable by means of shipping forks 25 and 26 into mesh with related gears 27, 28 and 29, these latter gears being fast to an input shaft 30 which is driven off the output end of the forward-and-reverse clutch mechanism. Detailed in Fig. 8 and which will be readily correlated to the change-speed gears by an inspection of Figs. 2 and 3, the shipping forks are given a slide journal upon a respective one of two vertically spaced horizontal shafts 31 and 32, the journaled hubs of the two forks presenting the customary opposingly disposed recesses selectively engaged by the terminal ball 33 of a shifting lever 34. Spring-pressed balls 35 carried by the shipping forks and arranged to lodge in mating detents of the two shafts 31 and 32 yieldingly resist movement of the shipping forks out of selected gear-change positions.

Figure 2:
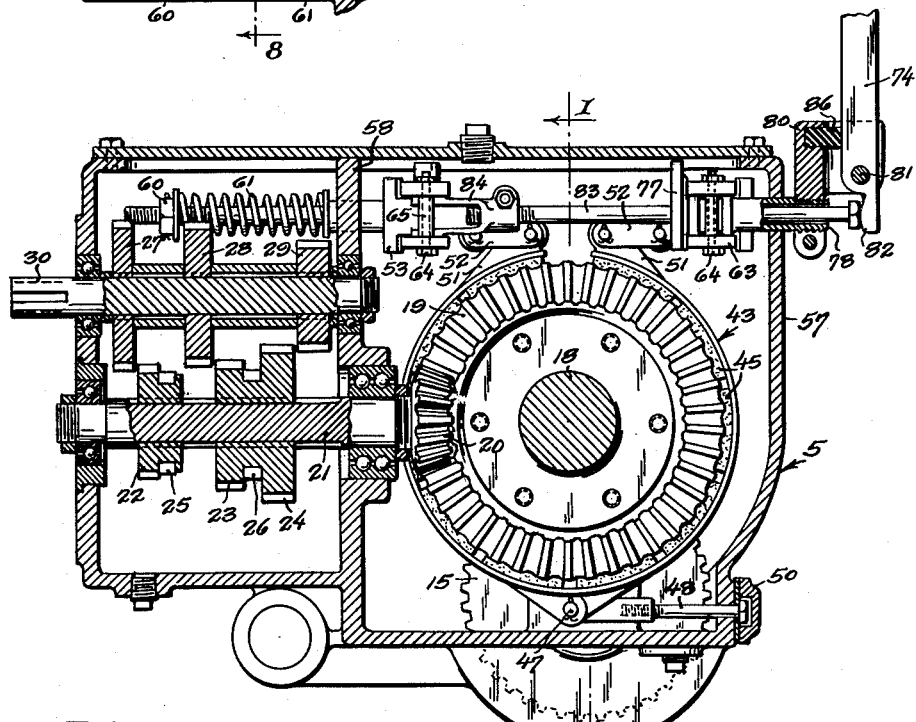
Fig. 2 is a longitudinal vertical sectional view on line 2—2 of Fig. 1.
Figure 4:
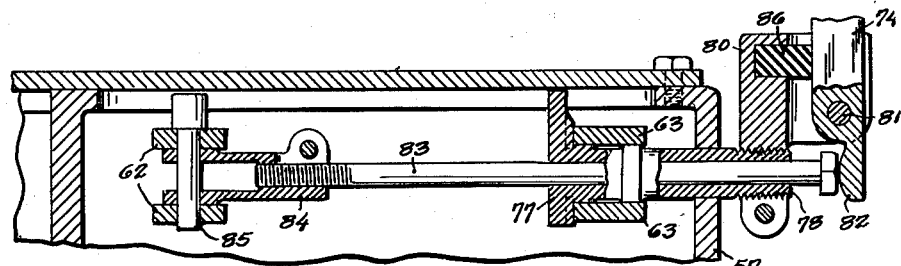
Figure 5:
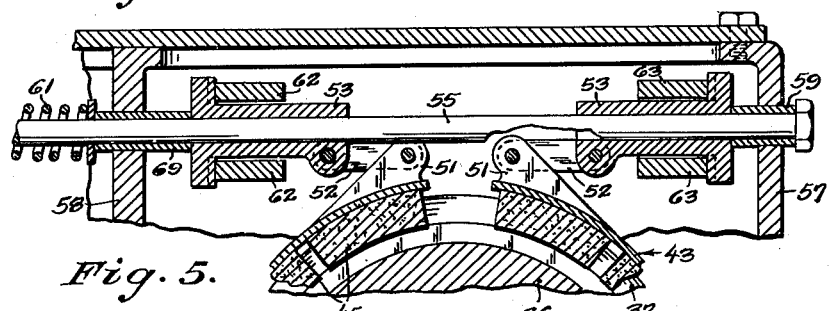
Figure 6:
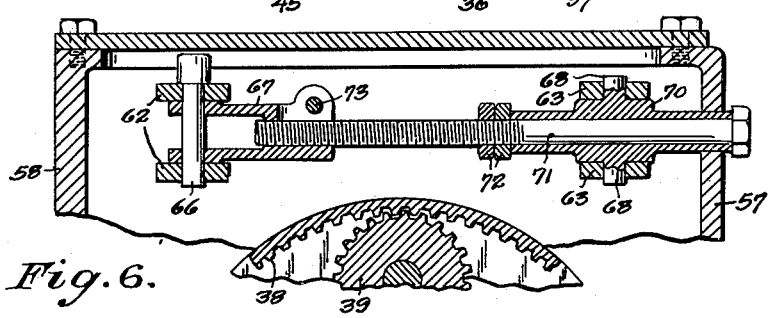
Figure 7:
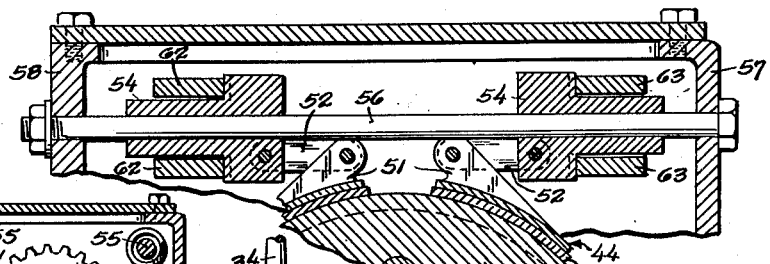

Now reverting to the planetary devices, and confining the description to one only of the two sets in that each said set is the substantial duplicate of the other, there is journaled upon the shaft 18 a wheel 36 which presents a V-groove 37 in its perimeter and also carries an annular internal gear 38 formed upon the underside of a circumferential flange which is produced as an integral prolongation of the wheel. A number of circumferentially spaced planet gears 39 mesh this internal gear and driving the planet gears is a sun pinion 40 keyed upon the master shaft 18. Supporting the planet gears is a spider 41 journaled for rotation upon the master shaft and the outer end of this spider is joined by a spline connection to the pinion 16 or to the pinion 17, as the case may be. The spider has upon its perimeter an annular flat rim 42. Functioning upon the wheel 36 and upon the spider 41 for arresting the rotation thereof are respective brakes, denoted 43 and 44, hereinafter termed the planetary brake and the traction brake, and which are each of a band nature faced in the one instance by sectional V-blocks, as 45, and in the other instance by flat lining 46. As its name implies, the brake 43 operates by contraction upon the V-groove of the wheel 36 to hold the internal gear against rotation and thereby causes the planet gears to track circumferentially about the master shaft 18, whereas the contraction of the other brake 44 performs its restraining action upon the spider and in consequence of the latter's geared connection with the crawler track either slows down or locks the latter. Each of the brake bands are composed of two shoes having a pivotal connection 47 at the bottom and to localize this pivot there is provided an anchoring bolt 48 which, for adjustment purposes, is made accessible from the outside of the case by the instrumentality of removing a cover plate 50 (Fig. 2).

The free ends of the brake shoes are provided with the usual lugs 51, and connecting by links 52 with these lugs are respective blocks 53 and 54, two of each, which are arranged to work in opposition to one another and which are carried for slide movement upon horizontal guide rods 55 and 56 positioned transverse to the master shaft. The guide rods 55 and 56 are each sustained by the front and back walls 57 and 58 of the main casing. Said rods are each made in the form of a nutted bolt, and are distinguished, in point of their mounting, by having the rod 56 held rigid to the casing and by giving to the rod 55 a floating support admitting to limited endwise movement. To this end, the headed end of the rod 55, and which is exposed to the outside of the casing wall 57, bears against a spacer sleeve 59 and the other or threaded end of the rod projects into the change-gear chamber of the casing and has its applied nut 60 bearing against a compression spring 61 which transmits its thrust upon a second spacer sleeve 69, the two sleeves bearing by their inner ends one against one and the other against the other of the two slide blocks 53. Elevationally considered, both sets of slide blocks are given a substantial T-shape to present terminal ears projecting top and bottom from the body proper of the block, and the blocks are so applied as to have the terminal ears lie at the outside in the instance of the blocks 53 and at the inside in the instance of the blocks 54. The two ears of each block are caused to shoulder by their inner faces against paired lever bars which are applied one above and one below the blocks, and the paired lever-bars are in sets of two placed more or less parallel to one another and to the axis of the master shaft with one pair, denoted 62, lying at one side and with the other pair 63 lying at the other side of said shaft. To fixedly secure the two lever-bars of each pair, the same are joined in separated relation by nutted bolts and spacers, as 64 and 65.

Each said pair of lever-bars is given a vertical fulcrum intermediate the blocks 53 and 54, and for the lever-bars 62 this fulcrum comprises a pin 66 passing through the bars and through an associated clevis 67. For the lever-bars 63 the fulcrum comprises trunnion pins 68 extending from opposite sides of a center-bored block 70. The block 70 presents tubular prolongations extending from opposite ends and one such end prolongation projects through and beyond the casing wall 57. There is received through the bore of block 70 a rod 71 fitting by its head end against said exposed end of the prolongation and held against end-wise movement relative to the block by lock nuts 72. The inner end of this rod threads into the clevis for tying the two fulcrums together, and a clamping screw 73 acts upon the clevis to place the rod under such limited compression as will normally preclude the same from turning while yet allowing adjustment through the employment of a wrench.

From the foregoing it will be apparent that the two springs 61 assert their force upon the related blocks 53 to normally activate the planetary brakes and hold the wheels 36 against rotation, the shouldering pressure of such blocks upon the paired lever-bars pressing the inner ends of these levers directively toward one another and consequently spreading the outer ends about the fulcrums 66 and 68 to responsively relieve the slide-blocks 54 of brake-setting pressure. The spiders 41 are hence free to turn while the internal gears 39 are locked, and the planet gears of both planetary sets move orbitally as one about the master shaft as a center. An arresting of the rotation of either of said spiders responsive to a setting of the brake 44 will, through its direct geared connection with the related sprocket wheel 10 or 11, as the case may be, brake the latter and cause the tractor to turn as the other sprocket wheel continues to receive driving energy.

In accomplishing said setting of the last-mentioned brake, there are provided two hand-activated control levers, as 74 and 75, one for one and the other for the other of the two sets of oppositely acting lever-bars, and these control levers act upon the inner ends of the lever bars and each performs its intended function of setting the related brake 44 by the act of spreading the inner ends of the lever-bars against the yielding pressure asserted by the spring 61. The control lever lies outside the casing wall 57 and is operatively interconnected with the proximal pair of lever-bars by a center-bored pull-block 77 formed upon one end with shoulders arranged to bear upon the inner edge of the lever bars and upon the other end with a tubular prolongation 78 projecting through the casing wall 57, there being clamped to the exposed end of this pull-block a member 80 carrying a transverse pin 81 which serves as a fulcrum mounting for the control lever. Received through the bore of the pull-block and operated by force of thrust imparted thereto by a pressure toe 82 of the control lever is a rod 83 formed, as with the other rods 55, 56 and 71, in the nature of a bolt, and the inner end of this rod threads into a clevis 84 which is secured by a pin 85 to the paired lever-bars which lie distal to the control lever, the thrust force of the lever perforce acting counter to a corresponding pull force transmitted from the fulcrum pin 81 through the mounting member 80 to the pull-block. For the purpose previously set forth in connection with the rod 71, the threads of the rod 83 are subjected to limited clamping pressure within the mating socket of the clevis 84. A rubber or coil-spring bumper 86 socketed in the mounting member 80 holds the pressure toe 82 firmly against the head of the control rod 83 to preclude chatter.

In operating the steering mechanism, and assuming that it is desired to execute a right turn, the operator draws back upon the control lever 74, and namely the lever which, looking forwards, lies to the right-hand side of the tractor's longitudinal center line. The lever, through its pressure toe, subjects the related rod 83 to thrust pressure while at the same time transmitting a pull force through its fulcrum pin 81 to the mounting member 80 and thence to the pull-block, whereupon the inner ends of the right-hand set of lever-bars are forced apart and, being fulcrumed at 66 and 68, compress the spring 61 and release the planetary brake by pressure of the lever-bars against the shoulders of the blocks 53, the simultaneous movement of the outer ends of the lever-bars toward one another pressing the shoulders of the blocks 54 toward one another and hence drawing the traction brake tight about the rim of the related spider, the arrested motion of the latter locking the right-hand crawler track whereupon the tractor is caused to wheel about this arrested track as a pivot. The other lever 75 will, perforce, act similarly upon the left-hand crawler track when it is desired to make a left turn. Turning can, of course, be accomplished by holding the control lever 74 or 75, as the case may be, in a neutral position and thus freeing both the planetary and the traction brake to simply break the drive to the related crawler track, and which is to say that an arresting of the related spider need only be resorted to where resistance to turning is greater than the turning effort. The import of the present control is that it obviates the need for both a hand-operated clutch-release lever and a foot-operated brake for controlling each of the two crawler tracks, combining the functions of both in a single lever.

In respect of the actuating parts for the steering mechanism, it is to be noted that all of these parts are free to float in a forward and backward direction for properly locating themselves with respect to the brake bands which are anchored only at the bottom. Should it become necessary to pick up any slack occurring in consequence of wear upon the brake linings, the required adjustment can be made exteriorly of the case by taking up on the exposed head of the rod 71 to bring the two fulcrum points 66 and 68 into closer relation, and should it become necessary to adjust the control rod 83 this also may be performed without opening the casing.

The invention, the manner of its operation, and its accomplishments are believed to be clearly understood from the foregoing. While having illustrated and particularly described the embodiment of the invention which I now consider to best exemplify my teachings, it is self-evident that numerous changes in the details of construction may be resorted to without departing from the spirit of the invention, and it is my intention that the hereto annexed claims be read with a scope fully commensurate with the broadest interpretation which the employed language fairly permits.

I claim:

1. In a steering transmission for crawler-type tractors, and in combination with a power shaft, two planetary gear sets one for each of the two crawler tracks and each comprised of a sun gear fast to the power shaft, an annular gear and a spider each journaled for rotation about the center of the shaft as an axis and each presenting a brake drum upon its perimeter, and planet gears carried by the spider and driven from the sun gear while tracking upon the annular gear, band-type brakes for each of said brake drums anchored at the bottom and presenting opposingly acting lugs at the top, guide rods for each of the brakes occupying positions above the latter and extending transverse to the shaft, a pair of slide-blocks for each of said brakes supported in axially spaced relation upon the guide rods and linked one to one and the other to the other of the two related lugs, and control means common to the four slide-blocks which are related to each planetary gear set and acting through said slide-blocks to apply either said brake alternatively while at the same time releasing the other brake.

2. In combination, a power shaft, a sun gear fast to the power shaft, an annular gear and a spider journaled for rotation about the center of the shaft as an axis and each presenting an annular braking surface, planet gears carried by the spider and driven from the sun gear while tracking upon the annular gear, band-type brakes for the annular gear and for the spider operating by activation the one to establish planetary motion of the planet gears and the other to arrest the rotation of the spider, the brake bands being anchored at the bottom and presenting opposed lugs at the top, guide rods for each of the brakes occupying parallel positions above the bands and extending transverse to the shaft, a pair of axially-spaced slide-blocks for each of said brakes receiving a slide journal upon the related guide rod, said slide-blocks being linked one to one and the other to the other of the two opposed lugs of the related brake band, a spring acting upon the slide blocks of the planetary brake and normally urging the same together for setting the brake, and a single control lever made functional to both sets of blocks and arranged to act in opposition to the spring for spreading the blocks of the planetary brake while coincidently contracting the blocks of the spider brake.

3. In combination, a power shaft, a sun gear fast to the power shaft, an annular gear and a spider journaled for rotation about the center of the shaft as an axis and each presenting an annular braking surface, planet gears carried by the spider and driven from the sun gear while tracking upon the annular gear, band-type brakes for the annular gear and for the spider operating by activation the one to establish planetary motion of the planet gears and the other to arrest the rotation of the spider, the brake bands being anchored at the bottom and presenting opposed lugs at the top, guide rods for each of the brakes occupying parallel positions above the bands and extending transverse to the shaft, a set of paired lever-bars traversing the rods one pair at one side and the other pair at the other side of a longitudinal plane traversing the axis of the power shaft and with one bar of each pair located above and the other below the rods, said lever-bars being fulcrumed intermediate the rods, a pair of slide-blocks journaled in axially spaced relation upon each of the guide rods and linked to the opposed lugs of the related brake band, said blocks having shouldering engagement with the lever-bars those of the planetary brake against the outer edges and those of the spider brake against the inner edges thereof, and a control lever common to both pairs of lever-bars and acting through the associated slide-blocks to set either of the two brakes alternatively while at the same time releasing the other brake.

4. In combination, a power shaft, a sun gear fast to the power shaft, an annular gear and a spider journaled for rotation about the center of the shaft as an axis and each presenting an annular braking surface, planet gears carried by the spider and driven from the sun gear while tracking upon the annular gear, band-type brakes for the annular gear and for the spider operating by activation the one to establish planetary motion of the planet gears and the other to arrest the rotation of the spider, the brake bands being anchored at the bottom and presenting opposed lugs at the top, guide rods for each of the brakes occupying parallel positions above the bands and extending transverse to the shaft, a set of paired lever-bars traversing the rods one pair at one side and the other pair at the other side of a longitudinal plane traversing the axis of the power shaft and with one bar of each pair located above and the other below the rods, said lever-bars being fulcrumed intermediate the rods, a pair of slide-blocks journaled in axially spaced relation upon each of the guide rods and linked to the opposed lugs of the related brake band, said blocks having shouldering engagement with the lever-bars those of the planetary brake against the outer edges and those of the spider brake against the inner edges thereof, a rod extending as a tie between the two fulcrums, a spring acting upon the slide blocks of the planetary brake and normally urging the same together to set the brake, and a control lever common to both pairs of lever-bars and acting through the latter to spread the blocks of the planetary brake while coincidently contracting the blocks of the spider brake.

5. In a steering transmission for crawler-type tractors, and in combination with the casing therefor, a power shaft, a sun gear fast to the power shaft, an annular gear and a spider journaled for rotation about the center of the shaft as an axis and each presenting an annular braking surface, planet gears carried by the spider and driven from the sun gear while tracking upon the annular gear, band-type brakes for the annular gear and for the spider operating by activation the one to establish a planetary motion of the planet gears and the other to arrest the rotation of the spider, the brake bands being anchored at the bottom and presenting opposed lugs at the top, guide rods for each of the brakes sustained by the case to lie in paralleling relation above the bands in positions transverse to the shaft, a set of paired lever-bars traversing the rods one pair at one side and the other pair at the other side of a longitudinal plane traversing the axis of the power shaft and with one bar of each pair located above and the other below the rods, fulcrum mountings for the lever-bars located intermediate the rods, a rod extending as a tie between the two fulcrums, a pair of slide-blocks carried in axially spaced relation by each of the guide rods and linked to the opposed lugs of the related brake band, said slide-blocks having shouldering engagement with the lever-bars those of the planetary brake against the outer edge and those of the spider brake against the inner edge of said bars, a spring acting upon the slide blocks of the planetary brake and normally urging the same together to set the brake, an actuating rod journaled for endwise movement along an axis paralleling that of the other rods and attached by an end to the end extremity of one pair of said lever-bars, a slide-block carried by the actuating rod and engaging the end extremity of the other pair of lever-bars, and a control lever arranged to work counter to the spring and acting upon said rod and upon the related slide-block to impart opposing movements thereto.

6. The steering mechanism of claim 5 employing a center-bored trunnion block the pins of which serve as the fulcrum mounting for one pair of said lever-bars, and wherein, for adjusting the spacing between the fulcrums, the tie-rod receives a journal mounting in the center-bore of said trunnion block and is held against endwise movement in relation thereto while threading into the fulcrum mounting for the other pair of said lever-bars.

7. The steering mechanism of claim 6 in which the tie-rod projects by an end through the wall of the transmission-case to enable the rod to be adjusted from outside the case.

8. The steering mechanism of claim 5 in which the entire activating mechanism for setting and releasing the brakes, and namely the lever-bars, the tie rods, slide-blocks, and actuating rod, is permitted to float freely in a direction endwise to the several rods.

9. In combination with a power shaft, a planetary gear set comprised of a sun gear fast to the power shaft, an annular gear and a spider each journaled for rotation about the center of the shaft as an axis and each presenting a brake drum upon its perimeter, and planet gears carried by the spider and driven from the sun gear while tracking upon the annular gear, band-type brakes for each of said brake drums anchored at the bottom and presenting opposingly acting lugs at the top, guide rods for each of the brakes occupying positions above the latter and extending transverse to the shaft, a pair of slide-blocks for each of said brakes supported in axially spaced relation upon the guide rods and linked one to one and the other to the other of the two related lugs, and control means common to the four slide-blocks acting through said slide-blocks to apply either said brake alternatively while at the same time releasing the other brake.

10. In combination with longitudinally spaced pairs of devices having the two devices of each pair mounted for transverse movements toward and from one another in opposition, activating means by which either pair of said paired devices are movable toward or from one another, selectively, while at the same time causing the two devices in the other pair to partake of an opposite action, said means comprising a pair of lever bars extending longitudinally as spanners from one to the other pair of said devices, and located one at one side and the other at the other side of an imagined longitudinal line centered as respects the two devices of each set, said bars being independently fulcrumed at points intermediate the ends thereof, a transverse rod adjustable for length and extending as a tie from one to the other said fulcrum, means coupling opposite ends of said bars, one bar to the two devices which lie at one side and the other bar to the two devices which lie at the other side of said longitudinal center line, and controlled means operatively connected with the bars to cause the latter to swing in unison oppositely in either direction about their respective fulcrum as an axis.

11. The structure of claim 10 in which the fulcrums and the tie-bar are supported for free floating action in a transverse direction.

PHILIP L. BANNAN.

REFERENCES CITED

The following references are of record in the file of this patent:

UNITED STATES PATENTS

| Number | Name | Date |
|---|---|---|
| 1,423,941 | Jeff | July 25, 1922 |
| 1,424,446 | Buckendale | Aug. 1, 1922 |
| 1,706,109 | Dodge | Mar. 19, 1929 |
| 1,767,254 | Norelius | June 24, 1930 |
| 1,863,621 | Corner | June 21, 1932 |
| 2,002,951 | Levin et al. | May 28, 1935 |
| 2,359,778 | Mork | Oct. 10, 1944 |

FOREIGN PATENTS

| Number | Country | Date |
|---|---|---|
| 16,053 | Great Britain | July 11, 1913 |
| 554,162 | Great Britain | June 23, 1943 |
| 24,405 | France | Mar. 14, 1922 |